(12) United States Patent
Katou et al.

(10) Patent No.: US 6,997,613 B2
(45) Date of Patent: Feb. 14, 2006

(54) FOIL BEARING

(75) Inventors: Daisuke Katou, Wako (JP); Hidehiko Nakata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 10/794,088

(22) Filed: Mar. 8, 2004

(65) Prior Publication Data

US 2004/0179759 A1    Sep. 16, 2004

(30) Foreign Application Priority Data

Mar. 12, 2003   (JP)   ............................ 2003-066396

(51) Int. Cl.
*F16C 32/06*   (2006.01)

(52) U.S. Cl. .................................................. 384/106
(58) Field of Classification Search ............... 384/103, 384/106

See application file for complete search history.

(56) References Cited

U.S. PATENT DOCUMENTS

| | | | | |
|---|---|---|---|---|
| 3,893,733 A | * | 7/1975 | Silver et al. ................. | 384/106 |
| 4,005,914 A | * | 2/1977 | Newman ..................... | 384/103 |
| 4,277,113 A |   | 7/1981 | Heshmat |  |
| 4,526,483 A | * | 7/1985 | Hishikawa et al. ......... | 384/106 |
| 4,616,388 A | * | 10/1986 | Soum et al. ................ | 384/103 |

* cited by examiner

*Primary Examiner*—Thomas R. Hannon
(74) *Attorney, Agent, or Firm*—Squire, Sanders & Dempsey LLP

(57) ABSTRACT

In a foil bearing (1), a foil assembly (4) disposed between a stationary mount member (3) and a journal (2) of a rotating member comprises: a top foil (5) having one end secured to an upper portion of the stationary mount member and extending circumferentially to surround a substantially entire outer circumferential surface of the journal; and a plurality of spring foils (6) arranged in an annular gap between the top foil and the stationary mount member, wherein each of the spring foils consists of a resilient piece which is bent to have a joint portion (8) attached to the stationary mount member and a slide contact portion (9) for contacting the top foil, and wherein the spring foils are arranged in a circumferential direction such that the slide contact portions of adjoining ones of the spring foils partially overlap each other.

8 Claims, 3 Drawing Sheets

FOIL BEARING

TECHNICAL FIELD

The present invention relates to a foil bearing comprising a stationary mount member surrounding a journal of a rotating member via an annular gap and a foil assembly disposed in the gap to support the journal.

BACKGROUND OF THE INVENTION

It is conventionally known to use a foil bearing as a bearing for a shaft (or journal) that rotates at a high speed such as at tens of thousands rpm, in which the foil bearing comprises a plurality of foils (flexible membranes) for forming a bearing surface and supports the shaft by means of pressure of a fluid dragged in between the shaft and the foils as the shaft rotates. In some of such foil bearings, a foil assembly is constituted by a cylindrical bearing sheet and a plurality of bump foils, each of which consists of a corrugated thin plate and is disposed radially outward of the cylindrical bearing sheet (see U.S. Pat. No. 4,277,113, for example).

In the foil bearings of this type, it is known that a resonance phenomenon may occur where an oscillation amplitude sharply increases at a particular rotation speed determined by the mass of the rotating member and the support rigidity of the bump foils. In order to reduce the oscillation amplitude at the resonance phenomenon, it is desirable to minimize the dynamic unbalance of the rotating member as well as to maximize the support rigidity of the foil assembly (or frictional damping force that the foil assembly generates against a displacement of the shaft).

As shown in FIG. 5, however, a conventional corrugated bump foil F contacts radially adjoining members (a stationary mount member 3a and a top foil 5a) with its curved surfaces and thus circumferential dimensions A, B of contact areas between the bump foil F and the top foil 5a and between the bump foil F and the stationary mount member 3a are quite limited, and this makes it difficult to achieve an adequate frictional damping force.

BRIEF SUMMARY OF THE INVENTION

In view of such problems of the prior art, a primary object of the present invention is to provide a foil bearing that can enable a larger frictional damping force to be generated by the foil assembly to thereby achieve a stable rotation over a wider rotation speed range.

According to the present invention, such objects can be accomplished by providing a foil bearing (1), comprising: a stationary mount member (3) for surrounding an outer circumferential surface of a journal (2) of a rotating member via an annular gap; and a foil assembly (4) disposed in the gap to support the journal, wherein the foil assembly comprises a top foil (5) having one end secured to a gravity-wise upper portion of the stationary mount member and circumferentially extending in one direction to assume a substantially cylindrical shape and whereby oppose a substantially entire portion of an outer circumferential surface of the journal, and a plurality of spring foils (6) arranged in an annular gap between the top foil and the stationary mount member, wherein each of the spring foils consists of a resilient piece which is bent to have a joint portion (8) attached to the stationary mount member and a slide contact portion (9) for contacting the top foil, and wherein the spring foils are arranged in a circumferential direction such that the slide contact portions of adjoining ones of the spring foils partially overlap each other.

According to the above structure, the overlapping slide contact portions of the spring foils form a substantially continuous circumferentially extending surface for contacting the top foil and thus provide an adequate contact area between the top foil and the spring foils to produce a sufficiently large frictional damping force. Because each spring foil may have a reduced length, it is possible to manufacture highly rigid spring foils that will not likely reach a plastic region when subjected to a load of the rotating member at a relatively low cost. Further, the load of the rotating member is distributed among the plurality of spring foils, and this can lead to an improved compliance of each spring foil.

Preferably, each of the spring foils has at least two bent portions (C1, C2) between the joint portion and the slide contact portion. This can simplify the shape of the spring foil for generating a resilient force in a radial direction, and thus achieve easy manufacture of the spring foil. Further, such bent portions can contribute to easier positioning of the spring foils when attaching them to the stationary mount member, to whereby make it possible to assemble the foil assembly precisely and reliably.

Also preferably, the slide contact portion of each spring foil comprises an arcuate surface having an approximately same curvature as the top foil. This can provide a larger contact area between the top foil and each spring foil to thereby increase the Coulomb damping force resulting from the friction therebetween.

In a preferred embodiment of the present invention, the slide contact portion of at least part of the plurality of spring foils is provided with a coating for adjusting a friction coefficient. For example, a copper coating or the like may be applied to increase the friction coefficient of the slide contact surface of the spring foils, to whereby increase the Coulomb damping force resulting from the friction between the top foil and the spring foils.

When using the coating, preferably at least part of the spring foils located at a gravity-wise lower side of the journal are provided with a larger friction coefficient resulting from the coating than those located at a gravity-wise upper side of the journal. The resulting larger frictional resistance of the slide contact portion of the lower spring foils makes these spring foils less easily deformed by the sliding action, which is equivalent to increasing the rigidity (or stiffness) of the spring foils.

Alternatively or additionally, at least part of the spring foils located at a gravity-wise lower side of the journal may have a larger thickness than those located at a gravity-wise upper side of the journal. This increases the rigidity of the lower spring foils and thus makes them less deformable.

It may be also possible that the slide contact portion of at least part of the spring foils located at a gravity-wise lower side of the journal has a larger circumferential dimension than that of the spring foils located at a gravity-wise upper side of the journal. The resulting larger frictional resistance of the slide contact portion of the lower spring foils makes these spring foils less easily deformed by the sliding action, which is equivalent to increasing the rigidity of the spring foils.

Further preferably, a surface of the top foil facing the journal is coated with DLC (Diamond Like Carbon). This minimizes the friction coefficient of the surface of the top foil contacting the journal, and thus allows easier start of rotation of the journal.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
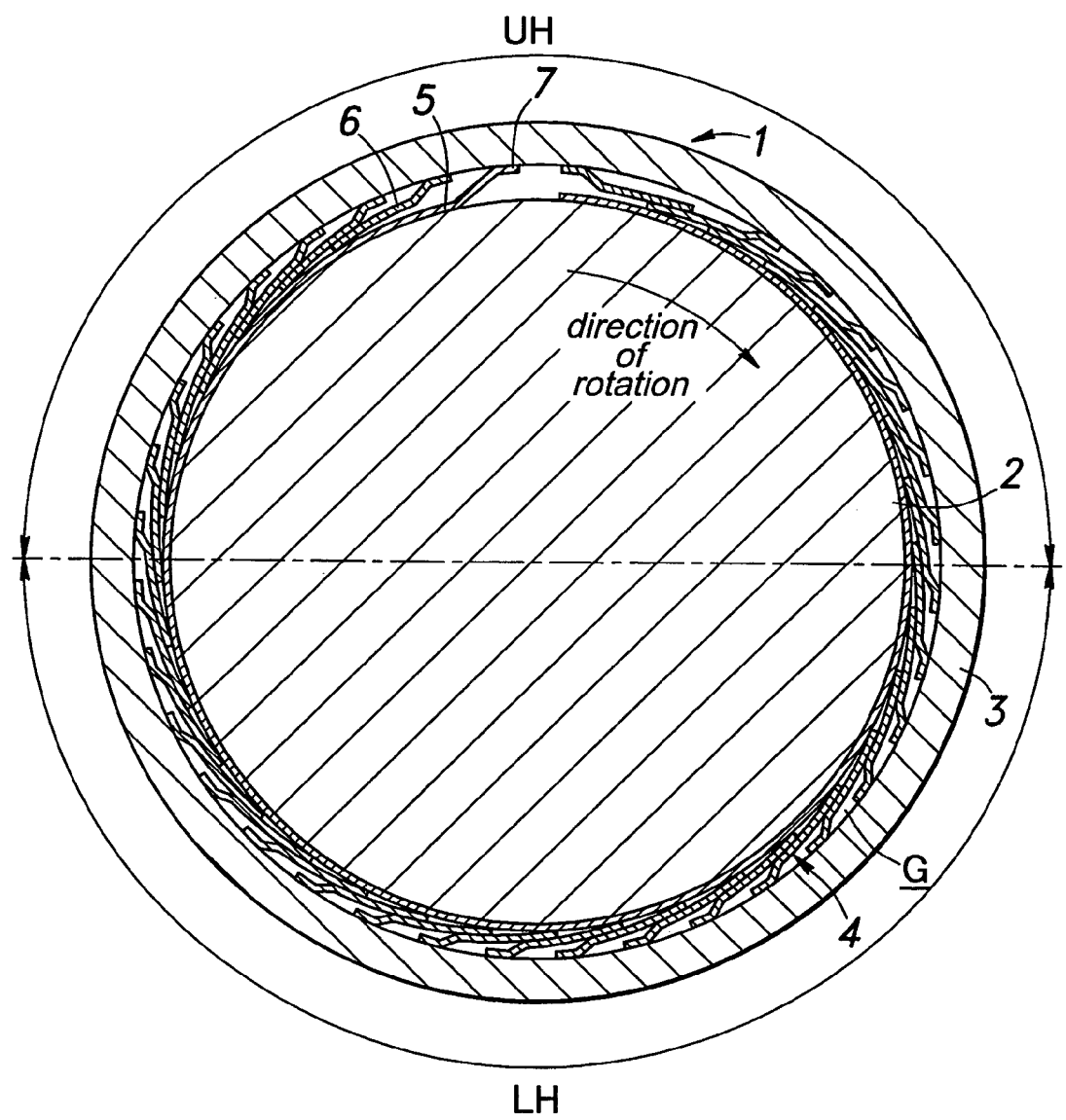
FIG. 1 is a cross-sectional view schematically showing an embodiment of a foil bearing according to the present invention.

FIG. 1 shows an embodiment of a foil bearing according to the present invention. This foil bearing 1 comprises a cylindrical stationary mount member 3 which is unrotatably fixed and surrounds a journal 2 of a rotating member, and a foil assembly 4 disposed in an annular gap G defined between an outer circumferential surface of the journal 2 and an inner circumferential surface of the stationary mount member 3.

The foil assembly 4 comprises a top foil 5 placed at an inner part of the annular gap G and a plurality of spring foils 6 which are arranged successively in a circumferential direction outside the top foil 5. It should be noted that in FIG. 1, the component parts may be shown at a scale different from the actual one in order to emphasize features of the foil assembly 4.

The top foil 5 consists of a sheet member made of inconel (trademark) or the like having a thickness of about 0.1 mm and is curved to extend to assume a substantially cylindrical shape so that substantially entire part thereof opposes the outer circumferential surface of the journal 2. One end of the top foil 5 is secured to a gravity-wise top portion of the inner circumferential surface of the stationary mount member 3 by means of a welded portion 7. Thus, the top foil 5 extends in a counterclockwise in FIG. 1 from the welded end to surround the outer circumferential surface of the journal 2. An inner circumferential surface of the top foil 5 (or a surface opposing the outer circumferential surface of the journal 2) is coated with DLC (Diamond Like Carbon) to minimize the friction coefficient of the surface contacting the journal 2 and thus allow easier start of rotation of the journal 2.

Figure 2:
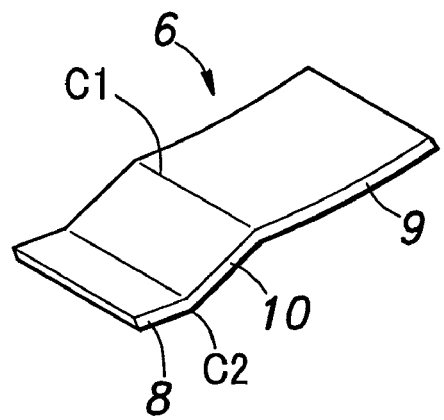
FIG. 2 is a perspective view showing a single spring foil shown in FIG. 1.

As shown in FIG. 2, each of the spring foils 6 consists of a substantially rectangular piece cut out of a sheet material such as inconel (trademark) or the like having a thickness of about 0.1 mm where the rectangular piece is bent at two positions c1, c2 such that the spring foil 6 has a joint portion 8 which is to be secured to the inner surface of the stationary mount member 3, a slide contact portion 9 extending arcuately in the circumferential direction with an appropriate curvature (preferably, substantially equal to a curvature of the outer circumferential surface of the top foil 5), and an oblique cantilever portion 10 for connecting the joint portion 8 and the slide contact portion 9. The spring foils 6 are each adapted to generate a resilient reaction force in a radial direction upon flexion of the cantilever portion 10.

Figure 3:
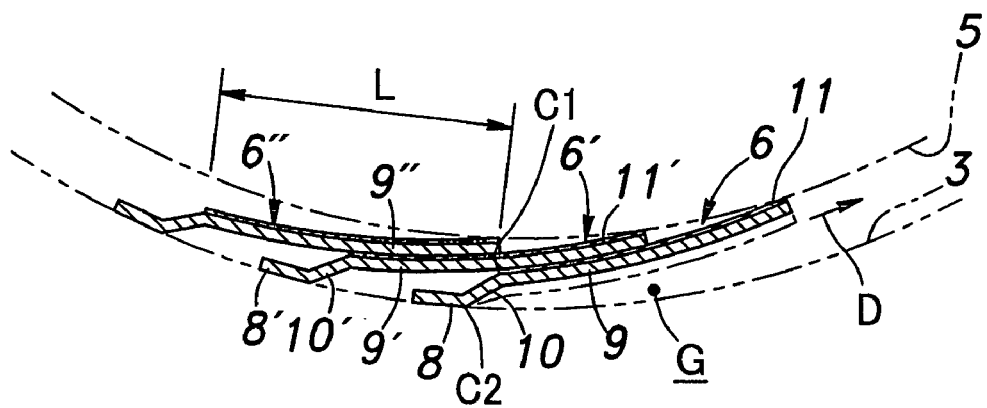
FIG. 3 is an enlarged cross-sectional view showing a part of the spring foils.

As shown in FIG. 3, after securing one spring foil 6 to the stationary mount member 3 by welding its joint portion 8 to the inner surface of the stationary mount member 3, a next spring foil 6' is secured to the stationary mount member 3 by welding its joint portion 8' to the inner surface of the stationary mount member 3 such that a radially inner surface of the slide contact portion 9 of one spring foil 6 is circumferentially covered (or overlapped) by a substantially half of a slide contact portion 9' of the next adjoining spring foil 6'. This process is repeated until all of the spring foils 6 are secured to the stationary mount member 3. In this way, the slide contact portion 9 of each spring foil 6 can slidably contact the outer circumferential surface of the top foil 5 while being resiliently urged toward the same. In securing the spring foils 6, the edge line (c1) between the slide contact portion 9 and the cantilever portion 10 of one spring foil 6 can be used as a reference when positioning subsequently secured spring foils. For example, a free end of a third (left end) spring foil 6" in FIG. 3 may be aligned with the edge line c1 of the first (right end) spring foil 6 to thereby achieve precise positioning of the third spring foil 6" easily.

The inner surface (or the surface facing the outer circumferential surface of the top foil 5) of the spring foils 6 placed in a region LH lower than a horizontal surface that passes a center of the stationary mount member 3 is provided with a copper coating 11, for example, in order to increase the friction coefficient. Thus, the spring foils 6 placed at gravity-wise lower positions have a higher friction coefficient than those placed at gravity-wise higher positions.

In this foil bearing 1, the journal 2 is rotatably supported inside the substantially cylindrical top foil 5 via a slight clearance therebetween. Because the foil assembly 4 is applied with a downward load due to the weight of the journal 2, the spring foils 6 placed at gravity-wise lower positions are caused to deform in a radially outward direction. Thus, when the journal 2 starts rotating clockwise, its center is offset in a downward direction with respect to the center of the stationary mount member 3. Then, the rotating journal 2 drags air into the space beneath the journal 2 to create a positive pressure while causing a negative pressure in the space on top of the journal 2. The balance between the resulting air pressure force and the weight of the rotating member acting upon the journal 2 determines an equilibrium position at which the journal 2 is sustained in a floating state.

If an external force or variation in the air pressure force or the like causes the center of the journal 2 to be displaced from the equilibrium position, the foil assembly 4 pressing the journal 2 via an air film is deformed. This generates a frictional resistance of the slide contact portions 9 of the spring foils 6, which serves as a restoring force against the displacement of the journal 2 to thereby maintain the equilibrium state of the journal 2 stably.

More specifically, when the journal 2 is displaced in the radial direction from the equilibrium position, a centrifugal load acting upon the top foil 5 is increased. This causes the cantilever portion 10 of each spring foil 6 supporting the load to deflect in the radially outward direction, where the bending position c2 between the cantilever portion 10 and the joint portion 8 welded to the stationary mount member 3 serves as a fulcrum, and accordingly the slide contact portion 9 moves radially outward. This causes the slide contact portion 9 of each deflected spring foil 6 to move relative to the outer circumferential surface of the top foil 5 in a direction indicated by an arrow D in FIG. 3, and during this movement, a frictional resistance is generated between the top foil 5 and the slide contact portion 9 of each spring foil 6 as well as between the mutually overlapping slide contact portions 9 of adjacent spring foils 6. These create a frictional damping force against the displacement of the journal 2.

Figure 4:
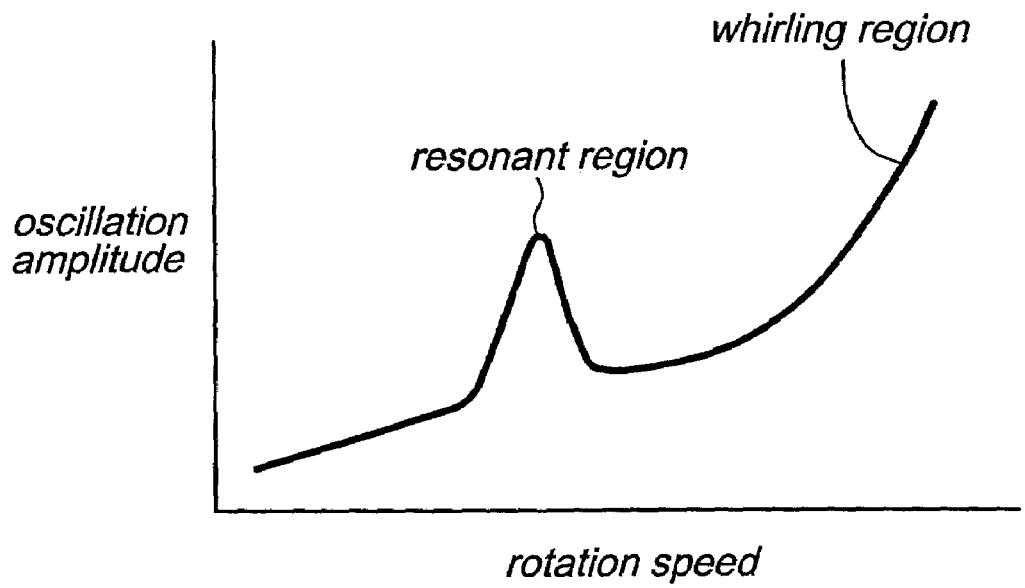
FIG. 4 is a graph showing a relationship between the rotation speed of the journal and the oscillation amplitude.

A larger frictional damping force is necessary in a resonant region of the rotating member (see FIG. 4) in order to suppress an increased oscillation that tends to appear in the resonant region. For this reason, in this embodiment of the present invention, a copper coating 11 is applied on a surface of each spring foil 6 that slidably contacts the top foil 5. Particularly, the provision of copper coating 11 on the spring foils 6 placed at gravity-wise lower positions (in region LH) considerably contributes to generating a large frictional damping force sufficient to suppress the oscillation instability in the resonant region of the journal 2. It should be noted that though the inner surfaces of the spring foils placed at lower positions are provided with the copper coating 11 in the above embodiment, it may be possible to provide the copper coating 11 to a part of the outer circumferential surface of the top foil 5 lower than the horizontal surface (in region LH) to achieve like effects. Further, by applying the copper coating on both sides of the slide contact portion 9 of each spring foil 6, it is possible to suitably adjust the friction coefficient between the mutually overlapping slide contact portions 9 to achieve a larger frictional damping force.

Meanwhile, when the rigidity of the foil assembly 4 is uniform in the circumferential direction, the center of rigidity of the foil assembly coincides with the center of the stationary mount member 3. In such a case, an equilibrium position of the center of the journal 2 at a low rotation speed is determined by an amount of deformation of the foil assembly 4 due to the weight of the rotating member acting upon the journal 2, and in the case of a clockwise rotation, the equilibrium position is offset in a lower left direction with respect to the center of the stationary mount member 3. As the rotation speed increases from that state, the journal 2 is applied with an air pressure force in an upper right direction and as a result, the center of the journal 2 starts moving clockwise from the lower-left offset position toward the center of rigidity of the foil assembly 4 (or the center of the stationary mount member 3). Then, as the center of the journal 2 approaches the center of the stationary mount member 3, the air pressure lifting the journal 2 is decreased, and this causes the center of the journal 2 to move in the lower left direction again. This process is repeated at a frequency depending on the rotation speed, resulting in a so-called whirling instability of the journal 2 (a whirling region in FIG. 4).

In order to deal with such an undesirable phenomenon, according to the present invention, the rigidity of the spring foils 6 is determined such that the spring foils 6 in the region LH which is below the horizontal plane passing the center of the stationary mount member 3 have a substantially larger rigidity than those in the region UH which is above the horizontal plane. In such a structure, the center of rigidity of the foil assembly 4 is positioned lower than the center of the stationary mount member 3. As a result, when an increase in the rotation speed lifts the journal 2 and causes the center of the journal 2 to move toward the center of rigidity of the foil assembly 4, it is possible to prevent the center of the journal 2 from approaching the center of the stationary mount member 3. This can avert the decrease in the lifting force that could cause the periodic movement of the journal 2, and whereby allow the journal 2 to rotate stably at a new equilibrium position corresponding to the increased rotation speed without causing the whirling instability. The whirling of the journal 2 can occur only at a higher rotation speed, and this results in a wider range of rotation speed in which the foil bearing 1 can operate stably.

It should be mentioned that the above-described application of copper coating 11 to the slide contact portion 9 of the spring foils 6 in the lower region LH to make the lower spring foils 6 less slippery than those in the upper region UH can result in the structure where the spring foils 6 in the lower region LH are less deformable than those in the upper region UH. Alternatively, such a structure can be achieved by: (1) making the spring foils 6 in the lower region LH thicker (and thus more rigid) than those in the upper region UH; (2) making the slide contact portion 9 of the spring foils in the lower region LH have a larger circumferential dimension (L in FIG. 4) and thus have a larger area than that of the spring foils 6 in the upper region UH (this makes the lower spring foils 6 less slippery and thus less flexible than the upper spring foils 6); (3) using a larger number of lower spring foils 6 than the upper spring foils 6; (4) arranging the lower spring foils 6 at a smaller circumferential interval than the upper spring foils 6; (5) making the lower spring foils 6 from a harder material than that for forming the upper spring foils 6, and so on.

It should be noted that in order to achieve the above structure it is only required that an average rigidity of the spring foils in the lower region LH be higher than that of the spring foils in the upper region UH, and thus the spring foils in each region do not have to have the same rigidity. For example, it is possible to arrange high-rigidity spring foils and low-rigidity spring foils in an alternate fashion or make the spring foils have gradually varying rigidities. Further, the above described means for achieving different rigidities of the spring foils in the upper and lower regions can be implemented alone or in an appropriate combination.

Figure 5:
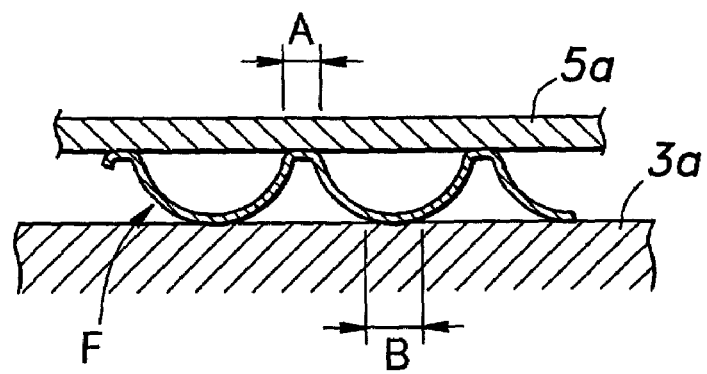
FIG. 5 is a schematic view for showing a conventional bump foil.

As mentioned above, the conventional corrugated bump foil F contacts the adjoining members (stationary mount member 3a and top foil 5a) with its curved surfaces (see FIG. 5) and therefore it is difficult to increase the circumferential dimensions A, B of the slide contact areas between the bump foil F and the top foil 5a and between the bump foil F and the stationary mount member 3a, resulting in a limited frictional force therebetween as well as Coulomb damping force. In contrast, according to the present invention, the slide contact area between the spring foils and the adjoining members can be easily increased by utilizing spring foils having a larger circumferential dimension L in FIG. 3, to thereby provide an adequate Coulomb damping force.

As described above, the present invention can bring about the following benefits:
1. Because each of the spring foils of the foil assembly consists of a resilient piece which is bent to have a joint portion attached to the stationary mount member and a slide contact portion for contacting the top foil and the spring foils are arranged in a circumferential direction such that the slide contact portions of adjoining ones of the spring foils partially overlap each other, each spring foil is allowed to have a reduced length and this can make it possible to manufacture highly rigid spring foils that will not likely reach a plastic region when subjected to a load of the rotating member at a relatively low cost. Further, the load of the rotating member is distributed among the plurality of spring foils, and this can lead to an improved compliance of each spring foil.
2. In the case where each of the spring foils is bent at least two positions (C1, C2) between the joint portion and the slide contact portion, the shape of the spring foil for generating a resilient force in a radial direction can be simplified, and this can allow easy manufacture of the spring foil. Further, such bent positions can contribute to easier positioning of the spring foils when attaching them to the stationary mount member, to whereby make it possible to assemble the foil assembly precisely and reliably.

3. In the case where the slide contact portion of each spring foil comprises an arcuate surface having an approximately same curvature as the top foil, it is possible to easily achieve a larger contact area between the top foil and each spring foil to thereby increase the Coulomb damping force resulting from the friction therebetween.

4. If the slide contact portion of at least part of the plurality of spring foils is provided with a coating for adjusting a friction coefficient, it is possible to easily increase the friction coefficient of the slide contact surface of the spring foils as well as the Coulomb damping force resulting from the friction between the top foil and the spring foils.

5. In the case where at least part of the spring foils located at a gravity-wise lower side of the journal are provided with a larger friction coefficient resulting from the coating than those located at a gravity-wise upper side of the journal, the resulting larger frictional resistance of the slide contact portion of the lower spring foils makes these spring foils less easily deformed by the sliding action, which is equivalent to increasing the rigidity of the spring foils.

6. In the case where at least part of the spring foils located at a gravity-wise lower side of the journal have a larger thickness than those located at a gravity-wise upper side of the journal, the resulting higher rigidity of the lower spring foils makes can make them less deformable.

7. In the case where the slide contact portion of at least part of the spring foils located at a gravity-wise lower side of the journal has a larger circumferential dimension than that of the spring foils located at a gravity-wise upper side of the journal, the resulting larger frictional resistance of the slide contact portion of the lower spring foils makes these spring foils less easily deformed by the sliding action, which is equivalent to increasing the rigidity of the spring foils.

8. In the case where a surface of the top foil facing the journal is coated with DLC (Diamond Like Carbon), the friction coefficient of the surface of the top foil contacting the journal can be minimized, and this allows easier start of rotation of the journal.

Although the present invention has been described in terms of a preferred embodiment thereof, it is obvious to a person skilled in the art that various alterations and modifications are possible without departing from the scope of the present invention which is set forth in the appended claims.

What is claimed is:

1. A foil bearing, comprising:
   a stationary mount member for surrounding an outer circumferential surface of a journal of a rotating member via an annular gap; and
   a foil assembly disposed in the gap to support the journal, wherein the foil assembly comprises a top foil having one end secured to a gravity-wise upper portion of the stationary mount member and circumferentially extending in one direction to assume a substantially cylindrical shape and whereby oppose a substantially entire portion of an outer circumferential surface of the journal, and a plurality of spring foils arranged in an annular gap between the top foil and the stationary mount member,
   wherein each of the spring foils consists of a resilient piece which is bent to have a joint portion attached to the stationary mount member and a slide contact portion for contacting the top foil,
   and wherein the spring foils are arranged in a circumferential direction such that the slide contact portions of adjoining ones of the spring foils partially overlap each other.

2. A foil bearing according to claim 1, wherein each of the spring foils has at least two bent portions between the joint portion and the slide contact portion.

3. A foil bearing according to claim 1, wherein the slide contact portion of each spring foil comprises an arcuate surface having an approximately same curvature as the top foil.

4. A foil bearing according to claim 1, wherein the slide contact portion of at least part of the plurality of spring foils is provided with a coating for adjusting a friction coefficient.

5. A foil bearing according to claim 4, wherein at least part of the spring foils located at a gravity-wise lower side of the journal are provided with a larger friction coefficient resulting from the coating than those located at a gravity-wise upper side of the journal.

6. A foil bearing according to claim 1, wherein at least part of the spring foils located at a gravity-wise lower side of the journal has a larger thickness than those located at a gravity-wise upper side of the journal.

7. A foil bearing according to claim 1, wherein the slide contact portion of at least part of the spring foils located at a gravity-wise lower side of the journal has a larger circumferential dimension than that of the spring foils located at a gravity-wise upper side of the journal.

8. A foil bearing according to claim 1, wherein a surface of the top foil facing the journal is coated with DLC.

* * * * *